US006362108B1

(12) United States Patent
Jacquinot et al.

(10) Patent No.: US 6,362,108 B1
(45) Date of Patent: Mar. 26, 2002

(54) COMPOSITION FOR MECHANICAL CHEMICAL POLISHING OF LAYERS IN AN INSULATING MATERIAL BASED ON A POLYMER WITH A LOW DIELECTRIC CONSTANT

(75) Inventors: Eric Jacquinot, Trosly Breuil; Pascal Letourneau, Cessy; Maurice Rivoire, Meylan, all of (FR)

(73) Assignee: Clariant (France) S.A., Puteaux (FR)

( * ) Notice: Subject to any disclaimer, the term of this patent is extended or adjusted under 35 U.S.C. 154(b) by 0 days.

(21) Appl. No.: 09/553,037

(22) Filed: Apr. 20, 2000

(30) Foreign Application Priority Data

Apr. 22, 1999 (FR) ............................................. 99-05123

(51) Int. Cl.$^7$ ............................................. H01L 21/00
(52) U.S. Cl. ..................... 438/693; 156/345; 216/38; 216/89; 252/79.2; 438/745
(58) Field of Search .................... 438/691, 692, 438/693, 745; 156/345 LP; 216/38, 88, 93, 89; 252/79.1, 79.2, 79.4

(56) References Cited

U.S. PATENT DOCUMENTS

| 5,382,272 A | | 1/1995 | Cook et al. | |
| 5,885,334 A | * | 3/1999 | Suzuki et al. | ............ 438/693 X |
| 6,043,159 A | | 3/2000 | Jacquinot et al. | |
| 6,046,111 A | * | 4/2000 | Robinson | ..................... 438/693 |

FOREIGN PATENT DOCUMENTS

| EP | 0 773 270 | 5/1997 |
| EP | 1 000 995 | 5/2000 |

OTHER PUBLICATIONS

EPO Search Report.
Abstract for JP Patent No. 2172812 XP–002127019.
N. H. Hendricks, Materials Research Society Symposium Proceedings, vol. 443, (1997) pp. 3–14.

L. Peters, Semiconductor International –Sep. 1998, pp. 64–74.

Y. L. Wang, C. Liu, S–T. Chang, M.–S. Tsai, M–S. Feng, W.–T Tseng, Thin Solid Films (1997) 308–309, pp. 550–554.

G. R. Yang, Y.–P, Zhao, Jam M. Neirynck, Shyam P. Murarka, R. J. Gutmann, Journal of Electronic Materials, vol. 26, No. 8, 1997, pp. 935–940.

J. M. Neirynck, S. P. Muraraka, R. J. Gutmann, Materials Research Society Symposium Proceedings, (1995) vol. 381, pp. 229–235.

R. K. Iler, The Chemistry of Silica, A. Wiley–Interscience Publication (1979) pp. 410–411.

P. H. Townsend, S. J. Martin, J. Godschalx, D. R. Romer, D. W. Smith, Jr., D. Castillo, R. DeVries, G. Buske, N. Rondan, S. Froelicher, J. Marshall, E. Q. Shaffer, J–H. Im, Materials Research Society Symposium Proceedings, 1997, vol. 476, pp. 9–17.

* cited by examiner

*Primary Examiner*—William A. Powell
(74) *Attorney, Agent, or Firm*—Susan S. Jackson; Scott E. Hanf

(57) ABSTRACT

A composition for mechanical chemical polishing of a layer in an insulating material based on a polymer with a low dielectric constant, comprising an acid aqueous suspension of cationized colloidal silica containing individualized colloidal silica particles not linked to each other by siloxane bonds and water as the suspension medium, process for mechanical chemical polishing of a layer of insulating material based on a polymer with a low dielectric constant and abrasive for the mechanical chemical polishing of a layer of insulating material based on a polymer with a low dielectric constant.

10 Claims, No Drawings

COMPOSITION FOR MECHANICAL CHEMICAL POLISHING OF LAYERS IN AN INSULATING MATERIAL BASED ON A POLYMER WITH A LOW DIELECTRIC CONSTANT

BACKGROUND OF THE INVENTION

The present invention relates to a composition for mechanical chemical polishing of a layer in an insulating material based on a polymer with a low dielectric constant.

FIELD OF THE INVENTION

Electronic devices made on a silicon slice must be connected to each other by means of interconnecting metallic tracks to constitute the desired electronic circuit. Each metallic interconnecting level must be electrically insulated. To this end, each level is encapsulated in a dielectric layer.

The interconnecting metallic tracks of integrated circuits are most often made by metal reactive ionic etching according the following sequence: an aluminium or aluminium alloy film approximately $10^{-12}$ m thick is deposited by means of a beam of electrons or beam of ions (sputtering); the design of the interconnecting circuit is then transferred there by photolithography then by reactive ionic etching (RIE). The tracks thus defined are then covered with a dielectric layer, usually based on silicon oxide, most often obtained by decomposition in the vapour phase of tetraethylorthosilicate (TEOS). This layer is then planarized by mechanical chemical polishing.

In order to reduce the capacitances induced by this dielectric, a route consists of using materials with a low dielectric constant. The best candidates were itemized by N. H. Hendricks—Mat. Res. Soc. Symp. Proc., vol. 443, 1997 p 3–14, and by L. Peters—Semi Conductor International—September 1998, p. 64–74.

The main families retained are:
fluorinated poly(arylethers) such as Flare®,
poly(arylethers) such as PAE-2,
fluorinated polyimides,
hydridosilsesquioxanes and alkylsilsesquioxanes,
bisbenzocyclobutenes such as Cyclotene®,
poly(p-xylylene) such as Parylene® N and poly($\alpha$, $\alpha$, $\alpha'$, $\alpha'$-tetrafluoro-p-xylylene) such as Parylene® F,
the aromatic ether polymers of perfluorocyclobutane,
aromatic hydrocarbons such as SiLK®.

In order to be integrated into a microelectronic interconnecting process, these polymers with a low dielectric constant must in the main satisfy the following criteria:
filling of trenches of widths greater than 0.35 pm,
a glass transition temperature greater than 400° C.,
a low absorption of humidity (<1%),
a high thermal stability (<1%/h at 450° C.),
and an excellent adhesion to metallic layers and other dielectric layers.

In addition, the polymer layer deposited must then be able to be planarized by mechanical chemical polishing.

DESCRIPTION OF THE RELATED ART

Y. L. Wang et al in *Thin Solid Films*, (1997), 308–309. p. 550–554, polished a layer of alkylsiloxane using an abrasive solution containing fumed silica particles in a basic medium (pH=10.2), or particles of zirconium oxide in acid medium (pH=3.3–4.6).

G. R. Yang et al. in *J. of Electronic Materials*, Vol. 26, No. 8, 1997, p.935–940 studied the surface quality of a layer of Parylene®N obtained after polishing with different abrasive solutions containing alumina particles in an acid or alkaline medium. The polishing speeds obtained were low whatever abrasive solution was used.

J. M. Neirynck et al in *Mater. Res. Soc. Symp. Proc.*, 1995, Vol. 381, p. 229–235, attempted to polish three types of polymers with low dielectric constants, Parylene®, benzocyclobutene (BCB) and a fluorinated polyimide, using abrasive solutions containing alumina particles in basic medium or acid medium.

SUMMARY OF THE INVENTION

At present, the integration of layers of polymer with a low dielectric constant into a microelectronic interconnecting process mainly comes up against the inadequate performances obtained on this type of material during planarization by mechanical chemical polishing. This stage is still poorly mastered, in particular as regards the polishing speed and the surface state of the polished surface.

It has been noted in a surprising and unexpected fashion that the use of an acid aqueous suspension of cationized colloidal silica, containing colloidal silica particles not linked to each other by siloxane bonds, allows a layer of insulating material based on a polymer with a low dielectric constant, in particular of SiLK® type, to be polished, with the result that a very good compromise is obtained regarding the polishing speed, the uniformity of polishing and the surface state of the polished surface.

DESCRIPTION OF THE PREFERRED EMBODIMENTS

A subject of the present Application is therefore a composition for mechanical chemical polishing of a layer in an insulating material based on a polymer with a low dielectric constant, characterized in that said polishing composition comprises an acid aqueous suspension of cationized colloidal silica containing individualized colloidal silica particles, not linked to each other by siloxane bonds and water as the suspension medium.

By "acid aqueous suspension of cationized colloidal silica", is meant an acid aqueous suspension of colloidal silica surface modified by tri- or tetravalent metal oxides such as aluminium, chromium, gallium, titanium or zirconium and which are in particular described in the book "The Chemistry of Silica—R. K. Iler-Wiley Interscience (1979)" p. 410–411.

Under preferred conditions for implementing the invention, the acid aqueous suspension of cationized colloidal silica containing colloidal silica particles, not linked to each other by siloxane bonds, is obtained from a solution of aluminium hydroxychloride at approximately 50% by weight in which an alkaline silica sol stabilized with sodium and at a pH of about 9 is introduced under agitation. In this way a stable suspension of cationized colloidal silica particles with a pH comprised between 3.5 and 4 is obtained.

In the present Application by "insulating material based on a polymer with a low dielectric constant of SiLK® type" is meant a material as described by PH. Towsend et al in Mat. Res. Soc. Symp. Proc. 1997, 476, p. 9–17. This material is constituted by an oligomeric solution with a viscosity of 30 centipoises the polymerization of which does not require a catalyst and does not lead to the formation of water. The polymerized network is an aromatic hydrocarbon which does not contain fluorine. Its dielectric constant is 2.65, its glass transition temperature is greater than 490° C. and its refractive index is 1.63.

Under preferred conditions for implementing the invention, the aforementioned aqueous suspension of colloidal silica is cationized by tri- or tetravalent metal oxides such as aluminium, chromium, gallium, titanium or zirconium and quite particularly aluminium.

Under other preferred conditions for implementing the invention, the above composition for mechanical chemical polishing will have a pH comprised between 1 and 6, preferably between 2 and 4.

Under yet other preferred conditions for implementing the invention, the above polishing composition contains cationized colloidal silica particles, not linked to each other by siloxane bonds, with a diameter comprised between 3 and 250 nanometers, preferably between 10 and 50 nanometers.

A subject of the present invention is also a process for mechanical chemical polishing of a layer of insulating material based on a polymer with a low dielectric constant in which abrasion of said layer of insulating material is carried out by rubbing said layer using a fabric containing an abrasive, characterized in that the abrasive contains an acid aqueous suspension of cationized colloidal silica containing individualized colloidal silica particles, not linked to each other by siloxane bonds, and water as the suspension medium.

A subject of the present invention is also an abrasive which is useful in particular for mechanical chemical polishing of a layer of insulating material based on a polymer with a low dielectric constant, comprising a fabric impregnated with an acid aqueous suspension of cationized colloidal silica containing individualized colloidal silica particles, not linked to each other by siloxane bonds, with a diameter comprised between 3 and 250 nanometers, with a pH comprised between 1 and 6, and water as the suspension medium.

Preferred conditions for implementing the abrasive compositions described above also apply to the other subjects of the invention envisaged above.

The scope of the invention can be understood better by referring to the examples given below, the aim of which is to explain the advantages of the invention.

EXAMPLES

Example 1
Abrasive Composition 1

The abrasive composition 1 is constituted by an acid aqueous suspension of colloidal silica, containing colloidal silica particles not linked to each other by siloxane bonds, and cationized by aluminium hydroxychloride described previously which has the following characteristics:

pH of the aqueous suspension: 3.5 average diameter of the elementary particles of colloidal silica: 50 nm concentration by weight in colloidal silica: 30%

An abrasive composition 1 according to the invention is obtained.

Example 2
Example of Mechanical Chemical Polishing with the Abrasive Composition 1

A deposit of SiLK® of 10000 Å thickness is carried out by centrifugation on 200 mm diameter slices of silicon. Then the layer is polymerized during a post-curing at 450° C.

The slices are then polished on a PRESI 2000 polisher under the following polishing conditions:

| | |
|---|---|
| applied pressure | 0.5 daN/cm$^2$ |
| turntable speed | 30 rpm |
| head speed | 42 rpm |
| abrasive temperature | 10° C. |
| abrasion rate | 100 cm$^3$/mn |
| fabric | IC 1400 Al from Rodel Products |

The polishing speed and the non-uniformity are determined by measuring the thickness of SiLK® using an ellipsometer before and after polishing, at 17 points of the slice.

This abrasive composition 1 allows the following results to be obtained:

a SiLK® polishing speed of 4000 Å/mn, no scratches observed under the optical microscope.

Example 3
Abrasive Composition 2

The abrasive composition 2 is similar to abrasive composition 1, but at a concentration by weight of colloidal silica of 15%.

An abrasive composition 2 according to the invention is obtained.

Example 4
Example of Mechanical Chemical Polishing with the Abrasive Composition 2

By using the same polishing parameters as in Example 2, this abrasive composition 2 allows the following results to be obtained:

a SiLK® polishing speed of 6000 Å/mn, no scratches observed under the optical microscope.

Relative to Example 2, an improvement in the SiLK® polishing speed is noted despite a concentration of active ingredient which is twice as low.

Example 5
Abrasive Composition 3

The abrasive composition 3 is constituted by an acid aqueous suspension of colloidal silica, containing colloidal silica particles not linked to each other by siloxane bonds, and cationized by aluminium hydroxychloride described previously which has the following characteristics:

pH of the aqueous suspension: 3.5 average diameter of the elementary particles of colloidal silica: 25 nm concentration by weight in colloidal silica: 4.4%

An abrasive composition 3 according to the invention is obtained.

Example 6
Example of Mechanical Chemical Polishing with the Abrasive Composition 3

By using the same polishing parameters as in Example 2, this abrasive composition 3 allows the following results to be obtained:

a SiLK® polishing speed of 3560 Å/mn, no scratches observed under the optical microscope.

Comparison Example 1

The abrasive composition is constituted by an acid aqueous suspension of colloidal silica, containing colloidal silica particles not linked to each other by siloxane bonds, the characteristics of which are the following:

pH of the aqueous suspension: 2.5 average diameter of the elementary particles of colloidal silica: 50 nm concentration by weight in colloidal silica: 30%

By using the same polishing parameters as in Example 2, this abrasive composition produced the following result:

a SiLK® polishing speed of 14 Å/mn.

This low speed forbids the use of this composition for the polishing of layers based on a polymer with a low dielectric constant.

Therefore, the interest in using an acid aqueous suspension of cationized colloidal silica against using an acid aqueous suspension of colloidal silica can be seen.

Comparison Example 2

The abrasive composition is constituted by a basic aqueous suspension of colloidal silica containing colloidal silica particles not linked to each other by siloxane bonds, the characteristics of which are the following:

pH of the aqueous suspension: 10.8 average diameter of the elementary particles of colloidal silica: 50 nm concentration by weight in colloidal silica: 30%

By using the same polishing parameters as in Example 2, this abrasive composition produced the following result.

a SiLK® polishing speed of 62 Å/mn.

This low speed forbids the use of this composition for the polishing of layers based on a polymer with a low dielectric constant.

Therefore, the interest in using an acid aqueous suspension of cationized colloidal silica against using a basic aqueous suspension of colloidal silica can be seen.

What is claimed is:

1. A composition for mechanical chemical polishing of a layer of insulating material based on a polymer with a low dielectric constant, characterized in that said polishing composition comprises an acid aqueous suspension of cationized colloidal silica containing individualized colloidal silica particles not linked to each other by siloxane bonds, and water as the suspension medium.

2. A composition for mechanical chemical polishing according to claim 1, characterized in that the acid aqueous suspension of colloidal silica is cationized by aluminium, chromium, gallium, titanium, zirconium.

3. A composition for mechanical chemical polishing according to claim 2, characterized in that the acid aqueous suspension of colloidal silica is cationized by aluminium hydroxychloride.

4. A composition for mechanical chemical polishing according to any one of claim 1, characterized in that said composition has a pH comprised between 1 and 6.

5. A composition for mechanical chemical polishing according to claim 4, characterized in that said composition has a pH comprised between 2 and 4.

6. A composition for mechanical chemical polishing according to any one of claim 1, characterized in that said composition comprises individualized silica particles not linked to each other by siloxane bonds with a diameter comprised between 3 and 250 nanometers.

7. A composition for mechanical chemical polishing according to claim 6, characterized in that said composition comprises individualized silica particles not linked to each other by siloxane bonds with a diameter comprised between 10 and 50 nanometers.

8. A process for mechanical chemical polishing of a layer of insulating material based on a polymer with a low dielectric constant in which abrasion of said layer of insulating material is carried out by rubbing said layer using a fabric containing an abrasive, characterized in that the abrasive contains an acid aqueous suspension of cationized colloidal silica containing individualized colloidal silica particles, not linked to each other by siloxane bonds and water as the suspension medium.

9. A process for mechanical chemical polishing according to claim 8, characterized in that the insulating material based on a polymer with a low dielectric constant is an aromatic hydrocarbon.

10. An abrasive for the mechanical chemical polishing of a layer of insulating material based on a polymer with a low dielectric constant comprising a fabric impregnated with an acid aqueous suspension of cationized colloidal silica containing individualized colloidal silica particles, not linked to each other by siloxane bonds, with a diameter comprised between 3 and 250 nanometers, a pH comprised between 1 and 6 and water as the suspension medium.

* * * * *